United States Patent
Hisatsune et al.

(10) Patent No.: US 12,461,783 B2
(45) Date of Patent: Nov. 4, 2025

(54) DATA PROCESSING MANAGEMENT SYSTEM AND DATA PROCESSING MANAGEMENT METHOD

(71) Applicant: Hitachi, Ltd., Tokyo (JP)

(72) Inventors: Taichi Hisatsune, Tokyo (JP); Shinichiro Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 490 days.

(21) Appl. No.: 18/181,083

(22) Filed: Mar. 9, 2023

(65) Prior Publication Data

US 2023/0325190 A1 Oct. 12, 2023

(30) Foreign Application Priority Data

Apr. 12, 2022 (JP) .................................. 2022-065955

(51) Int. Cl.
*G06F 9/46* (2006.01)
*G06F 9/50* (2006.01)

(52) U.S. Cl.
CPC ...... *G06F 9/5016* (2013.01); *G06F 2209/501* (2013.01); *G06F 2209/502* (2013.01)

(58) Field of Classification Search
CPC ............. G06F 9/5016; G06F 2209/501; G06F 2209/502
See application file for complete search history.

(56) References Cited

U.S. PATENT DOCUMENTS

| 11,868,773 B2 * | 1/2024 | Battle ................... G06F 9/3842 |
| 2013/0086368 A1 * | 4/2013 | Gschwind ............. G06F 9/3832 712/E9.035 |

FOREIGN PATENT DOCUMENTS

JP 2017-134443 A 8/2017

* cited by examiner

*Primary Examiner* — Diem K Cao
(74) *Attorney, Agent, or Firm* — Volpe Koenig

(57) ABSTRACT

The data processing management system includes a queue deployment system that deploys a queue with a processing description of stream processing having a branch instruction being an input. The queue deployment system designates processing to be preferentially executed for the processing description, measures throughputs in respective processing after the branch instruction, and obtains branch proportions that at which the respective processing after the branch instruction is executed. The queue deployment system then computes deployment costs in a case of deploying a queue between the branch instruction and the respective processing after the branch instruction, for combinations of the respective processing after the branch instruction using the throughputs and the branch proportions, and outputs a queue deployment pattern for preventing a decrease in a throughput of the processing to be preferentially executed among the respective processing after the branch instruction.

12 Claims, 21 Drawing Sheets

FIG. 4

```
Input = read_input();                            ── 401
Input.add_field(category);                       ── 402
Input.add_date();
Input.convert_name(name);
if(Input.name == "Machine-*"){                   ── 403
  Input.add_tag();
  export(LOCAL_DB);
}else if(Input.name == "Sesnsors-*"){
  Input.convert_16(sensor-2);
  Input.calculate(sensor-1,sensor-2,total);
  export(CLOUD_DB_1);                            ── 404
  export(CLOUD_DB_2);
  export(VISUALIZE_SERVICE);
}
```

FIG. 5

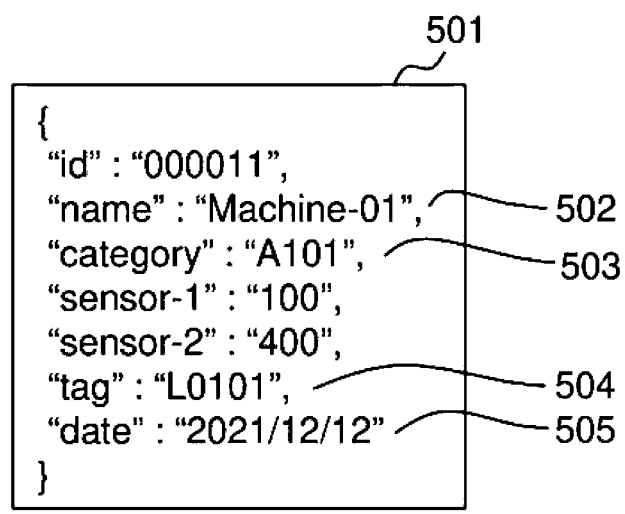

```
{
  "id" : "000011",
  "name" : "Machine-01",        ── 502
  "category" : "A101",          ── 503
  "sensor-1" : "100",
  "sensor-2" : "400",
  "tag" : "L0101",              ── 504
  "date" : "2021/12/12"         ── 505
}
```
501

1201

| PROCESSING | THROUGHPUT (ms) |
|---|---|
| PROCESSING A | 10 |
| PRIORITY PROCESSING | 10 |
| PROCESSING B | 20 |
| HIGH-LOAD PROCESSING | 100 |

1301

| QUEUE | PORT | CAPACITY | SYSTEM | THROUGHPUT |
|---|---|---|---|---|
| topic-A | :9080 | 10 MB | kafka | 15 ms |
| topic-B | :9080 | 10 MB | kafka | 15 ms |
| topic-C | :2121 | 5 MB | redis | 10 ms |
| topic-D | :2121 | 3 MB | redis | 10 ms |

FIG. 14

| BRANCH NUMBER | PROPORTION (%) |
|---|---|
| if-1 | 30 |
| if-2 | 50 |
| if-3 | 20 |

| DIVISION PROPORTION TABLE ||
|---|---|
| if-1 | XX% |
| if-2 | XX% |
| if-3 | XX% |

| # | VALUE |
|---|---|
| NUMBER OF WORKERS | 2 |
| INFLOW AMOUNT OF INPUT DATA | 6000 |
| MEASUREMENT TIME PERIOD | 60 s |

| # | PRIORITY PROCESSING | PROCESSING B | HIGH-LOAD PROCESSING | IMPROVED THROUGHPUT (ms) |
|---|---|---|---|---|
| 1 | 0 | 0 | 0 | - |
| 2 | 0 | 1 | 0 | - |
| 3 | 0 | 0 | 1 | 13 |
| 4 | 0 | 1 | 1 | 11 |

1701, 1702

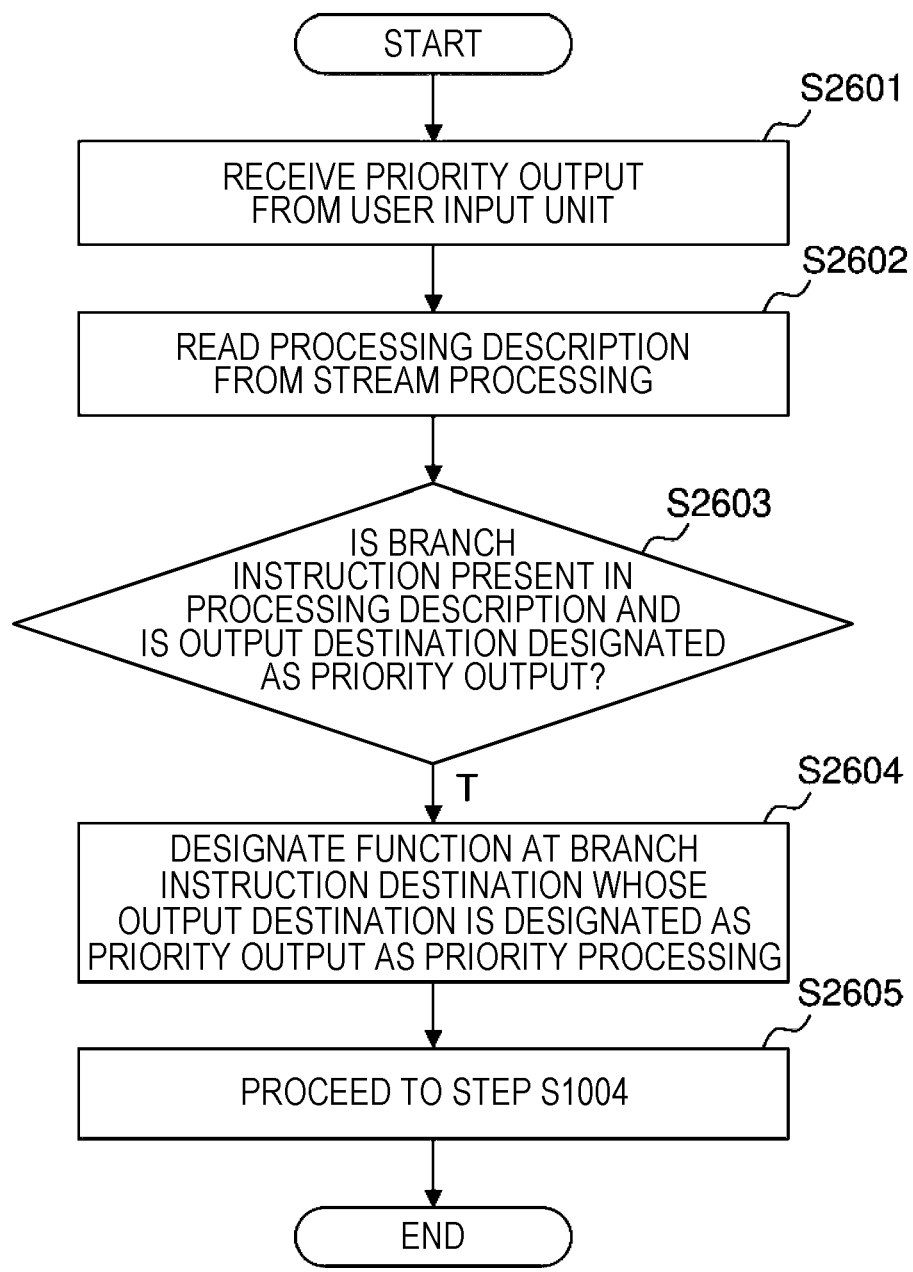

DATA PROCESSING MANAGEMENT SYSTEM AND DATA PROCESSING MANAGEMENT METHOD

BACKGROUND OF THE INVENTION

1. Field of the Invention

The present invention relates to a data processing management system and a data processing management method.

2. Description of the Related Art

In industry, business improvement and business visualization using Internet of Things (IoT) are in progress. In particular, in the manufacturing industry, data analysis and utilization for collecting, arranging, processing, and analyzing sensors and log data in a factory in real time to generate new value is accelerating. In order to realize real-time data collection, stream processing is effective. In this processing, data received from a sensor is sequentially shaped, converted into a format for data analysis, and then output to a database.

Here, J P 2017-134443 A discloses a technique related to data processing using a plurality of processing elements. That is, JP 2017-134443 A discloses "a processor including: a plurality of processing elements each of which includes a temporary storage unit that temporarily stores an assigned unit instruction string and is capable of executing an instruction included in the unit instruction string stored in the temporary storage unit; and an execution management unit that divides a program as an instruction string at a level equal to or lower than an assembly language into the unit instruction strings as an instruction string not including a branch instruction in a middle portion and as an instruction string having a head instruction at a branch destination being a start end and a branch instruction being an end, sequentially assigns the divided unit instruction strings respectively to the plurality of processing elements, and causes the plurality of processing elements to respectively execute the assigned unit instruction strings in parallel".

SUMMARY OF THE INVENTION

In the method described in JP 2017-134443 A, the instruction string is divided in the unit of instructions, and a queue that enables temporary storage is deployed before the unit instruction string, but utilization of the queue in the temporary storage itself in stream processing might cause a delay because the utilization means transfer and reading of data to and from a queue system. Here, in order to execute economically more efficient processing, important branch processing in which a throughput delay is fatal, such as branch processing to be output to a real-time visualization function, needs to be treated as one stream processing without deploying a queue, and a required throughput speed needs to be provided. Further, in order to prevent a decrease in the throughput for the important branch processing, the queue needs to be preferentially inserted to high-load branch processing that becomes a bottleneck in accordance with the number of workers and the throughput performance of the processing at a branch destination.

From such a viewpoint, an object of the present invention is to provide a data processing management system and a data processing management method capable of preventing a decrease in a throughput of processing desired to be prioritized in a case where a branch instruction is present in stream processing.

A first aspect of the present invention provides a following data processing management system. The data processing management system includes a queue deployment system that deploys a queue with a processing description of stream processing having a branch instruction being an input. The queue deployment system designates processing to be preferentially executed for the processing description, measures throughputs in respective processing after the branch instruction, and obtains branch proportions that at which the respective processing after the branch instruction is executed. The queue deployment system computes deployment costs in a case where a queue is deployed between the branch instruction and the respective processing after the branch instruction for combinations of the respective processing after the branch instruction, using the throughputs and the branch proportions, and outputs a queue deployment pattern for preventing a decrease in a throughput of the processing to be preferentially executed among the respective processing after the branch instruction.

A second aspect of the present invention provides a following data processing management method. The data processing management method is a method performed by using a processor. The data processing management method includes acquiring a processing description of stream processing having a branch instruction, designating processing to be preferentially executed for the processing description; measuring throughputs in respective processing after the branch instruction, obtaining branch proportions at which the respective processing after the branch instruction is executed, computing deployment costs in a case of deploying a queue between the branch instruction and the respective processing after the branch instruction for combinations of the respective processing after the branch instruction, using the throughputs and the branch proportions, outputting a queue deployment pattern for preventing a decrease in a throughput of the processing to be preferentially executed among the respective processing after the branch instruction; and deploying the queue based on the queue deployment pattern.

The present invention provides the data processing management system and the data processing management method capable of preventing a decrease in the throughput of the processing desired to be prioritized in a case where a branch instruction is present in stream processing.

BRIEF DESCRIPTION OF THE DRAWINGS

FIG. 4 is a code illustrating an example of a processing description;

FIG. 5 is a code illustrating an example of data to be output by the stream processing system;

FIG. 14 illustrates an example of a branch proportion table in the system of the present invention;

FIG. 15 is a diagram illustrating an example of a screen for inputting to a management table in the system of the present invention through the user input unit;

FIG. 16 illustrates an example of a computing information table in the system of the present invention;

FIG. 17 illustrates an example of a queue deployment pattern table in the system of the present invention;

FIG. 26 is a flowchart illustrating an example of processing of a queue deployment system in the exemplary configuration illustrated in FIG. 25.

DESCRIPTION OF THE PREFERRED EMBODIMENTS

Figure 1:
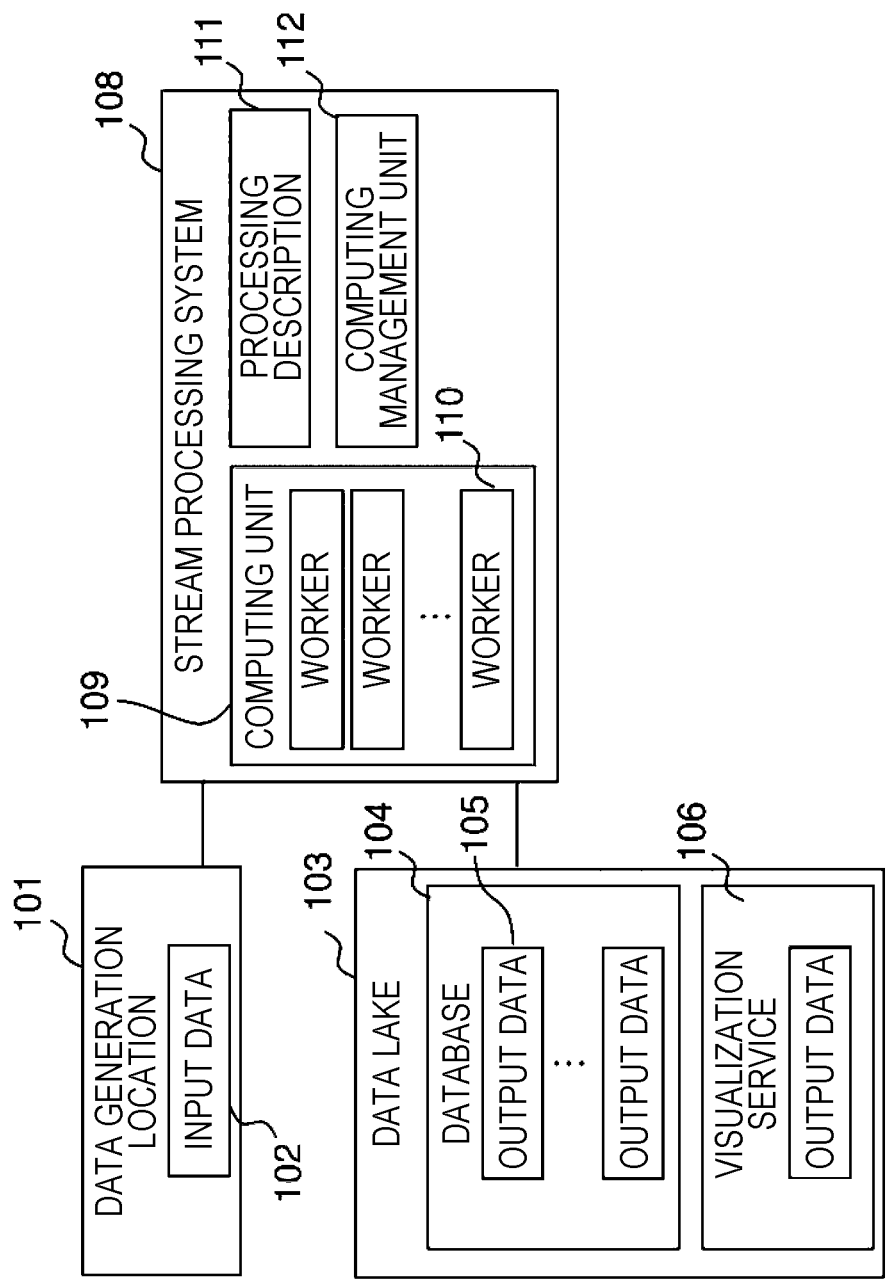
FIG. 1 is a diagram illustrating an example of a configuration of a general stream processing to which the present invention is applicable.

First, a general stream processing will be described with reference to FIG. 1. FIG. 1 illustrates a configuration example of the general stream processing.

A stream processing system 108 includes a plurality of workers 110 in a computing unit 109. The worker 110 is determined by the number of processors mounted on hardware on which the system operates, and executes the processing described in a processing description 111. The computing unit 109 can execute processing in accordance with the number of the workers 110 in parallel. When the processing is allocated to the worker 110, processing other than the assigned processing are not assigned until the assigned processing is completed, and the worker 110 enters a free state after completion of the processing. A processing is newly assigned to the worker 110 in the free state upon reception of data.

Figure 2:
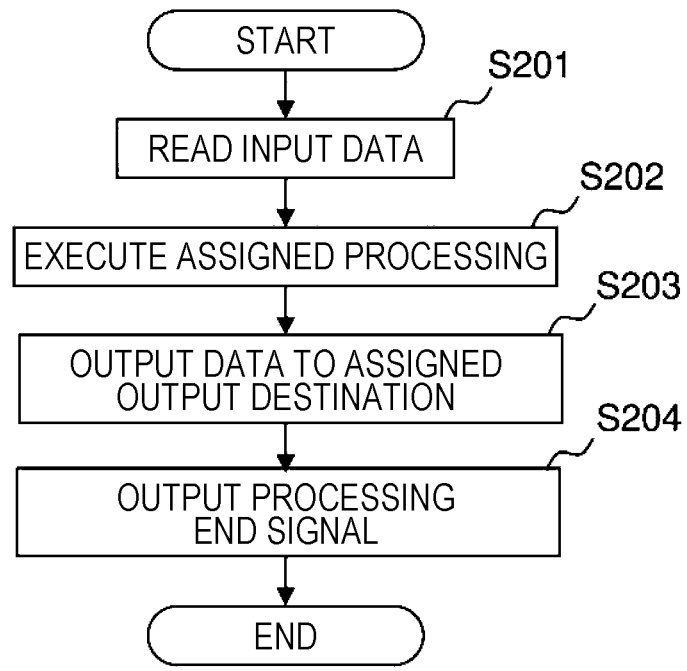
FIG. 2 is a flowchart illustrating an example of a worker processing procedure on a stream processing system.
Figure 3:
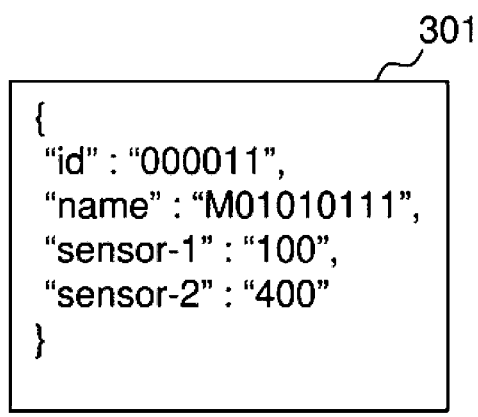
FIG. 3 is a code illustrating an example of data to be input to the stream processing system.

FIG. 2 illustrates a general flowchart during an operation of the worker 110. The worker 110 in the free state first reads input data 102 (S201). Here, an example of the input data 102 will be described with reference to FIG. 3. FIG. 3 illustrates an example of input data 301, which is data input in a JavaScript Object Notation (JSON) format. In the JSON format, values are key-value-stored. In FIG. 3, 000011 is stored in id, M01010111 is stored in name, 100 is stored in sensor-1, and 400 is stored in sensor-2. The input data may be data of a comma separated value (CSV) format, or merely a numerical value or a character string in addition to the data in JSON format. In the stream processing, the worker 110 operates for each input data illustrated in FIG. 3 and executes processing.

The worker 110 executes processing of an assigned processing description on the input data (S202). The processing description will be described with reference to FIG. 4. FIG. 4 is an example of the processing description, and the stream processing system 108 executes processing sequentially by calling functions in a JavaScript format. For example, a line 401 indicates reading of input data, and a line 402 indicates insertion of a category key into the input data. A line 403 indicates that conditional branch is performed in a case where the name of the key includes a character string "Machine-". A line 404 indicates output to a database on a cloud. The processing description is performed in the order of input processing, processing, and output processing, thereby enabling the processing and the output on the input data.

The worker 110 outputs the processed input data to an output destination designated on the assigned processing description (S203). The output data will be described with reference to FIG. 5. FIG. 5 illustrates an example of the output data in the JSON format obtained by processing the input data of FIG. 3. As compared with FIG. 3, in an output data 501, the value of a name key 502 is changed to Machine-01, and a category key 503, a tag key 504, and a date key 505 are newly added. As described above, in the stream processing, conversion of a value inside data and insertion of metadata are generally performed.

Since the worker 110 has completed the assigned processing, the worker 110 outputs a processing end signal to a computing management unit 112 (S204).

Figure 6:
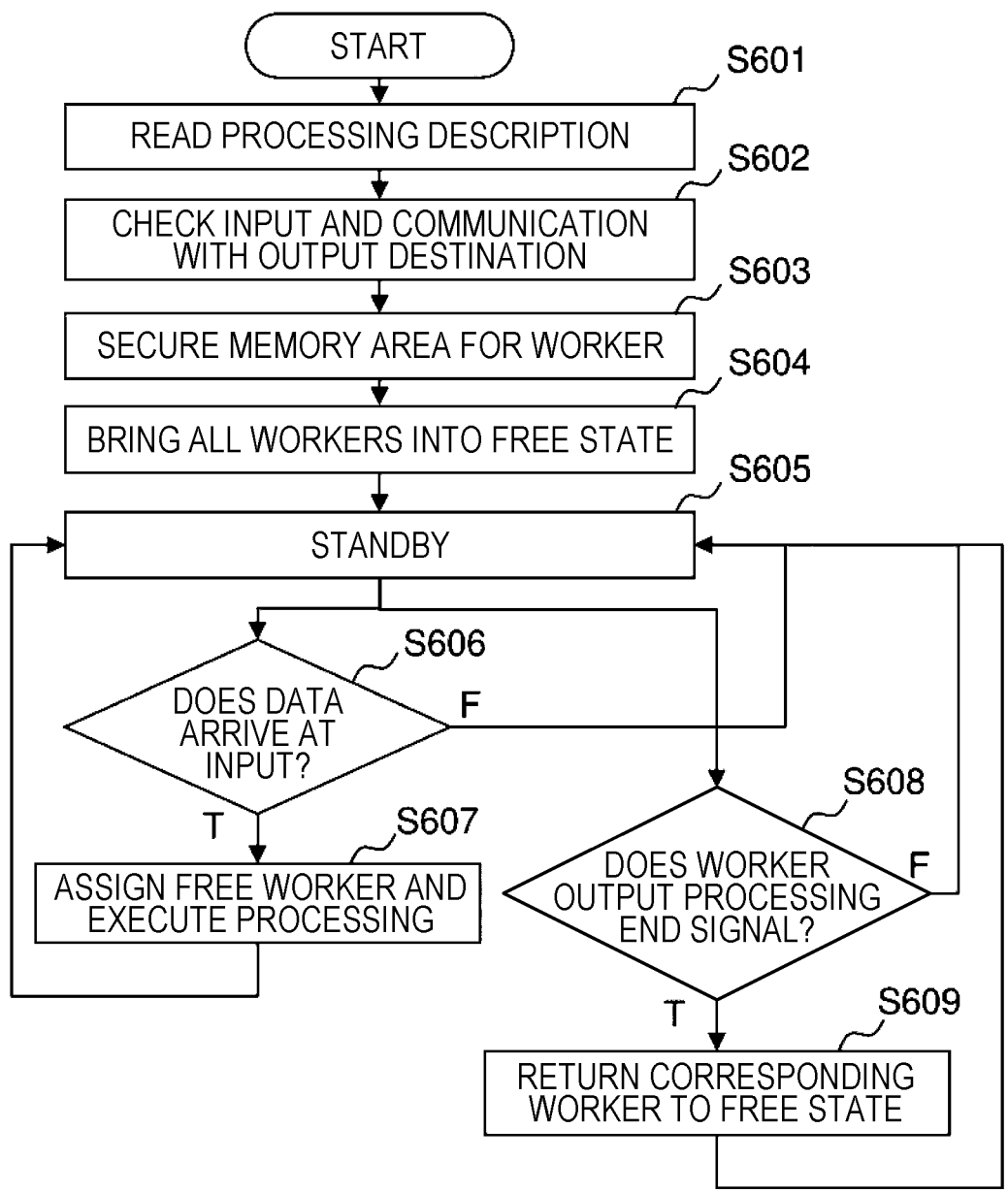
FIG. 6 is a flowchart illustrating an example of worker management processing on the stream processing system.

Processing of the computing management unit 112 will be then described with reference to FIG. 6. FIG. 6 is a flowchart of a general operation of the computing management unit 112 that manages the workers 110 and the processing description in the stream processing system 108.

The computing management unit 112 reads the processing description (S601). In order that the worker 110 executes the processing description, the computing management unit 112 confirms communication with each device and the database to determine whether input data can be received and data can be output (S602). The computing management unit 112 allocates a memory to the worker 110 to execute the processing description (S603). When executing the processing description, each worker 110 keeps a portion necessary for the processing from the memory allocated in this step and executes the processing. At this time, the memory allocated to each worker 110 is not shared, and each worker 110 releases the secured memory area when the processing is completed. The computing management unit 112 sets all the workers 110 in the free state (S604) and waits (S605).

In a case where the input data has arrived (S606), the processing then proceeds to step S607. In order to execute the processing on the input data, the computing management unit 112 brings any free worker 110 into a processing state and causes this worker 110 to execute the processing of the processing description (S607).

The corresponding worker 110 executes the processing in accordance with the flow illustrated in FIG. 2. After the processing is assigned, the processing of the computing management unit 112 proceeds to step S605 again.

In a case where the worker 110 outputs the processing end signal to the computing management unit 112, the processing proceeds to step S609 (S608). Since the worker 110 has completed the processing, the computing management unit 112 returns the worker 110 to the free state (S609). The processing of the computing management unit 112 returns to step S605 again. As described above, in accordance with the above flowchart, the stream processing system 108 processes the input data 102 into the stream format based on the processing description 111, and outputs the processed data as output data 105.

In order to achieve a high speed in the stream processing having the above configuration, it is important for improving the performance to operate the workers 110 in parallel, set one input and one output, and make the throughput of each worker 110 constant. On the other hand, in recent years, data utilization has been diversified. The diversified utilization includes not only real-time visualization of one data but also storage of data in a database on a cloud, data processing and output for artificial intelligence (AI), and the like.

According to the above-described diversified utilization for data analysis, a conditional branch of the processing and storage in a plurality of databases are achieved by branch instructions in stream processing for data collection relating to the prior art. However, the branch instructions in the stream processing cause variations in the throughput among the workers 110, and the processing at a branch destination with a high processing load occupies the workers 110. This might cause the deterioration of the throughput of the entire stream processing. In general, in a case where high-load processing is a bottleneck in the stream processing, throughput improvement can be expected by inserting a queue represented by a buffer immediately before the high-load processing and by separating the stream processing into two parts.

Each embodiment will be described below with reference to FIGS. 7 to 26. Note that descriptions similar to the contents described above may be omitted.

First Embodiment

<Configuration>

Figure 7:
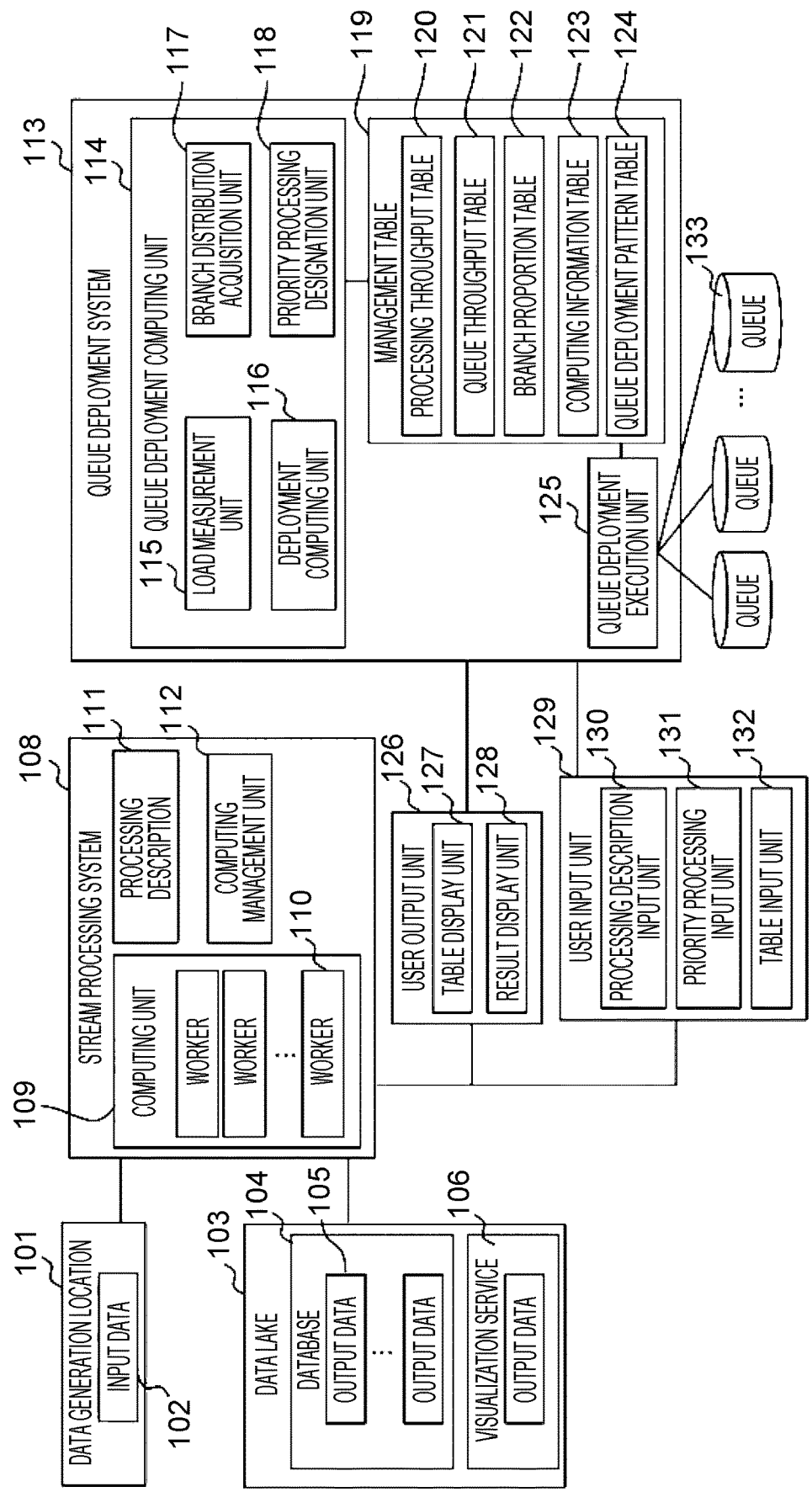
FIG. 7 is a diagram illustrating a relationship between a system of the present invention and a related stream processing system.

FIG. 7 illustrates an example of a system according to the first embodiment. The system can manage stream processing and, as an example, can manage a cache in analysis for a database. This system (data processing management system) is configured by associating three systems: a queue deployment system 113; a user output unit 126; and a user input unit 129 with the stream processing system 108. That is, the system includes the queue deployment system 113, the user output unit 126, and the user input unit 129.

In the embodiment, the stream processing system 108 receives the input data 102 from a data generation location 101. Further, the stream processing system 108 reads the processing description 111 described by a user through the user input unit 129, and executes processing of the computing management unit 112. That is, the stream processing system 108 assigns the workers 110 of the computing unit 109 to the respective piece of the input data 102 based on the processing description. The stream processing system 108 then outputs the output data 105 to a database 104 and a visualization service 106 of a data lake 103.

Note that examples of the data generation location 101 include a sensor, a robot main machine, and a programmable logic controller (PLC) for operating the main machine, which are installed in a factory. Examples of the data lake 103 include a relational database (RDB), a file system, and a not-only structured query language (NoSQL) database.

The queue deployment system 113 is connected to the stream processing system 108. In a case where a branch instruction is present in the processing description 111 input through the user input unit 129 and priority processing is designated, a queue deployment computing unit 114 generates a table group in a management table 119. Thereafter, a queue deployment execution unit 125 has a function of dividing the processing description 111, deploying a queue 133, and then implementing the queue in the stream processing system 108.

The user input unit 129 receives the processing description 111 to be operated in the stream processing system 108 through a processing description input unit 130. In a case where a branch instruction is present in the processing description 111, the user input unit 129 receives designation of the priority processing with respect to processing at a branch instruction destination through a priority processing input unit 131. Further, the user input unit 129 receives an input to the management table 119 of the queue deployment system 113 through a table input unit 132.

The user output unit 126 has a function of displaying the tables of the management table 119 on the table display unit 127 and displaying the processing description 111 operating on the stream processing system 108 and the deployed queue 133 on a result display unit 128.

Figure 8:
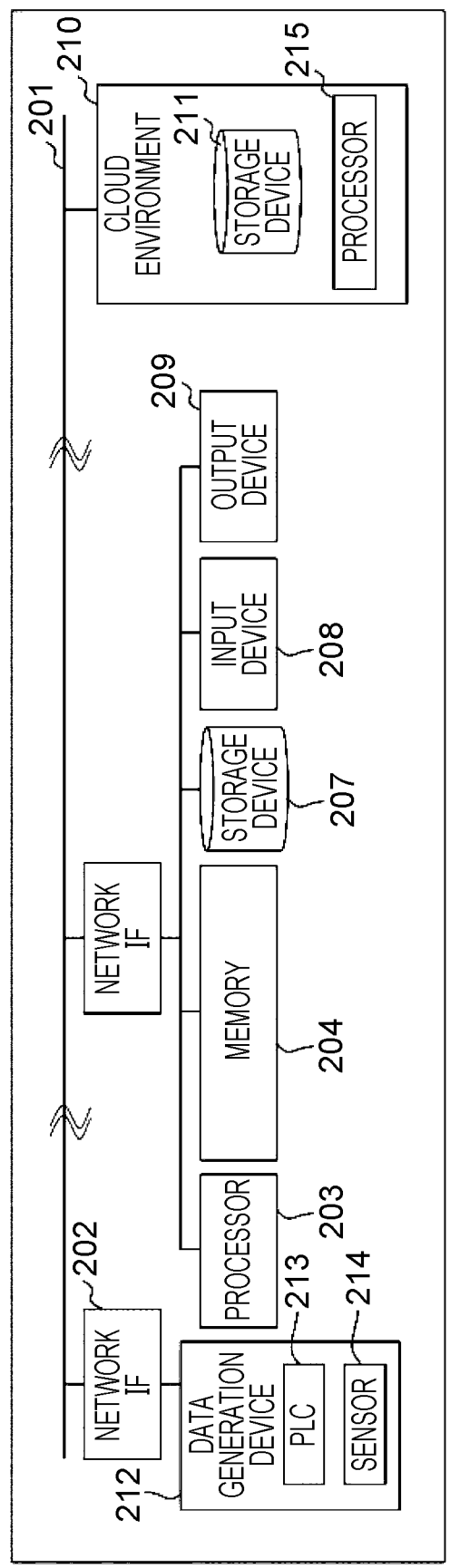
FIG. 8 is a diagram illustrating an example of hardware constituting the system of the present invention.

FIG. 8 illustrates an example of a hardware configuration where the system according to the first embodiment is mounted. The stream processing system 108 and the queue deployment system 113 are deployed on a computing machine including a processor 203, a storage device 207, and a memory 204, and predetermined processing is executed inside the memory 204. A data generation device 212, the computing machine, and a cloud environment 210 are connected by a network 201 via a network IF 202 to perform communication.

An input device 208 includes a keyboard, a mouse, a touch panel, or a combination of the mouse or the like and a display. The user input unit 129 can be configured by using the input device 208. An output device 209 includes a display. The user output unit 126 can be configured by using the output device 209. The storage device 207 includes a nonvolatile storage medium, and can store data output by the stream processing system 108 (pipeline processing system), the processing description 111, and the like. The queue deployed by the queue deployment system 113 can be deployed in the memory 204 or can be managed inside the storage device 207 in a case where the queue is huge.

The data generation device 212 receives data from a PLC 213 and a sensor 214, and outputs the data via the network IF 202. As an example, the device can be configured by a computing machine including a processor and a memory. On the other hand, for example, when the PLC 213 or the like has a data output function using the network IF 202, the PLC itself (the configuration itself having the data output function) functions as the device.

The cloud environment 210 indicates an external computing machine connected via the Internet. In this example, the cloud environment 210 includes a storage device 211 and a processor 215 as appropriate, and the stream processing system 108 can also perform output to the storage device 211 or an application operating on the cloud environment 210.

<Processing>

When the processing description 111 is input from the user input unit 129 to the stream processing system 108 described above and the processing description 111 includes a branch instruction, the system according to the first embodiment performs rewriting to data for appropriately deploying the queue 133 and transfers the processing description where deterioration of a throughput is improved to the stream processing system 108. Here, the branch instruction means a conditional branch for making a determination in accordance with positive or negative of if as indicated in a line 403 of FIG. 4 in JavaScript, or a conditional statement, such as a switch statement, for executing processing appropriately for a plurality of conditions.

Figure 9:
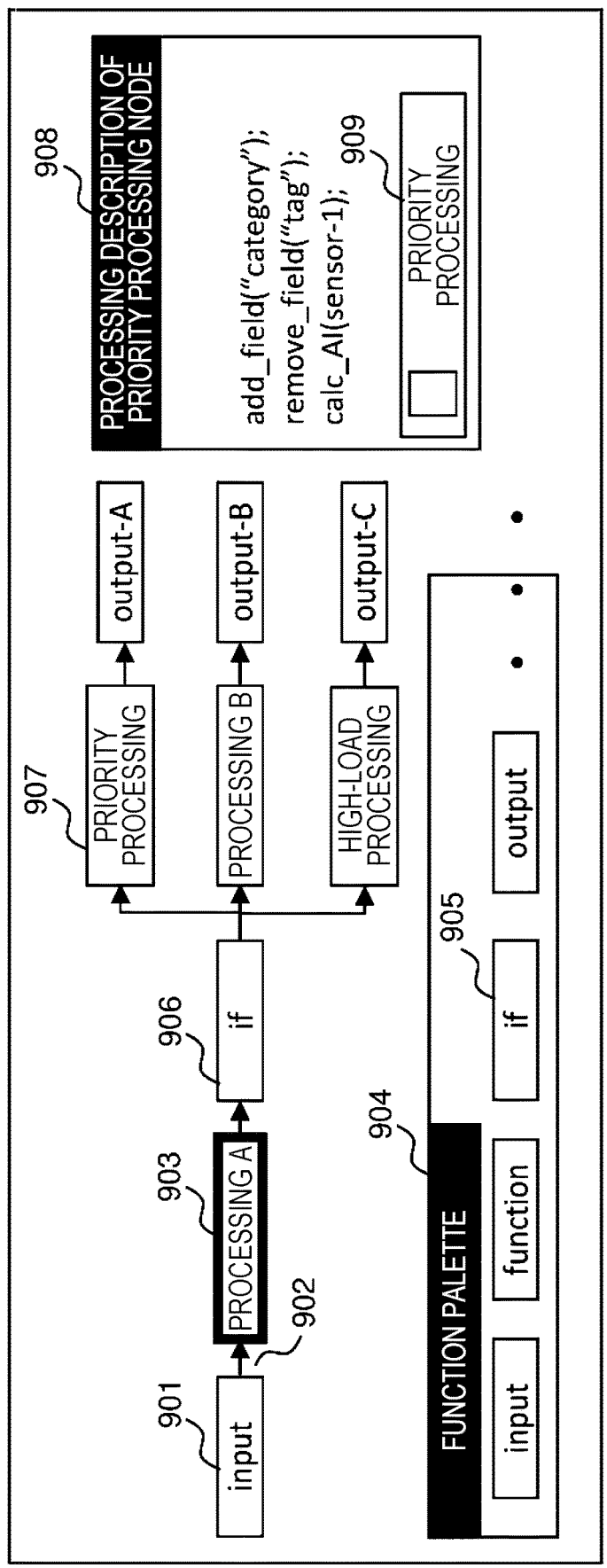
FIG. 9 is a diagram illustrating an input screen for designating a processing description and priority processing in the system of the present invention using a user input unit.

Next, an example of an operating flow of the queue deployment system 113 will be described. The queue deployment system 113 operates when the processing description 111 input by the user through the user input unit 129 is transferred to the stream processing system 108. First, the input of the processing description 111 by the user will be described with reference to FIG. 9. FIG. 9 illustrates an example of an input screen in the user input unit 129. In the screen illustrated in FIG. 9, functions and the order of the functions desired to be described in the processing description can be designed by a node and an edge.

A node 901 means that an input function is placed, and by connecting to a node 903 (processing A) by an edge 902, a code for executing a function 903 of the processing A is described as a processing description after an input function 901. Each function can be selected from a function palette 904. For example, when a user selects a node 905 (if) having the meaning of a branch instruction from the palette, the if node can be connected as the processing description.

Here, in a case where the branch instruction is present in the processing description, the user can designate, for input to the queue deployment system 113, priority processing for a function to be connected after the branch instruction. The priority processing designation is applied to processing in which a real-time property for preventing a throughput delay is emphasized. For example, in FIG. 9, a node 907 (priority process) is processing after a node 906 (if), and is a function that can designate the priority processing.

In a case where the node for the priority processing is edited on the screen illustrated in FIG. 9, an editing screen 908 is output in response to the user selecting a target node. On the editing screen 908, a code relating to the node is displayed, and a priority processing check 909 is also displayed. Here, when the user enables the priority processing check 909, the priority processing function is designated as priority processing. In a case where a branch instruction is included in the processing description designed by the user in the user input unit 129, the processing description and the priority processing designation are transferred to the queue deployment system 113 before being transferred to the stream processing system 108.

Note that a display mode in FIG. 9 is an example, and may be changed as appropriate. For example, in addition to the input screen illustrated in FIG. 9, all the processing descriptions may be described as codes. Further, the mode of the node is not limited to the mode illustrated in FIG. 9.

For convenience, in this example, the function (node 907) to be subjected to the priority processing is indicated by "priority processing" in the drawing. However, for example, like "processing C", a node that is a candidate for the priority processing may be indicated in a simple mode in which the priority processing is not designated. The user may then select a node, output the editing screen 908, and designate priority processing for the node.

For convenience, in this example, the function of the high-load processing is indicated by "high-load processing". However, like "processing D", a node relating to the high-load processing may be indicated in a simple mode in which the high-load processing is not designated.

By selection any node, the editing screen 908 relating to this node may be output. Here, the user may select a node indicated in the function palette 904 or may select a nod indicated outside the function palette 904.

Figure 10:
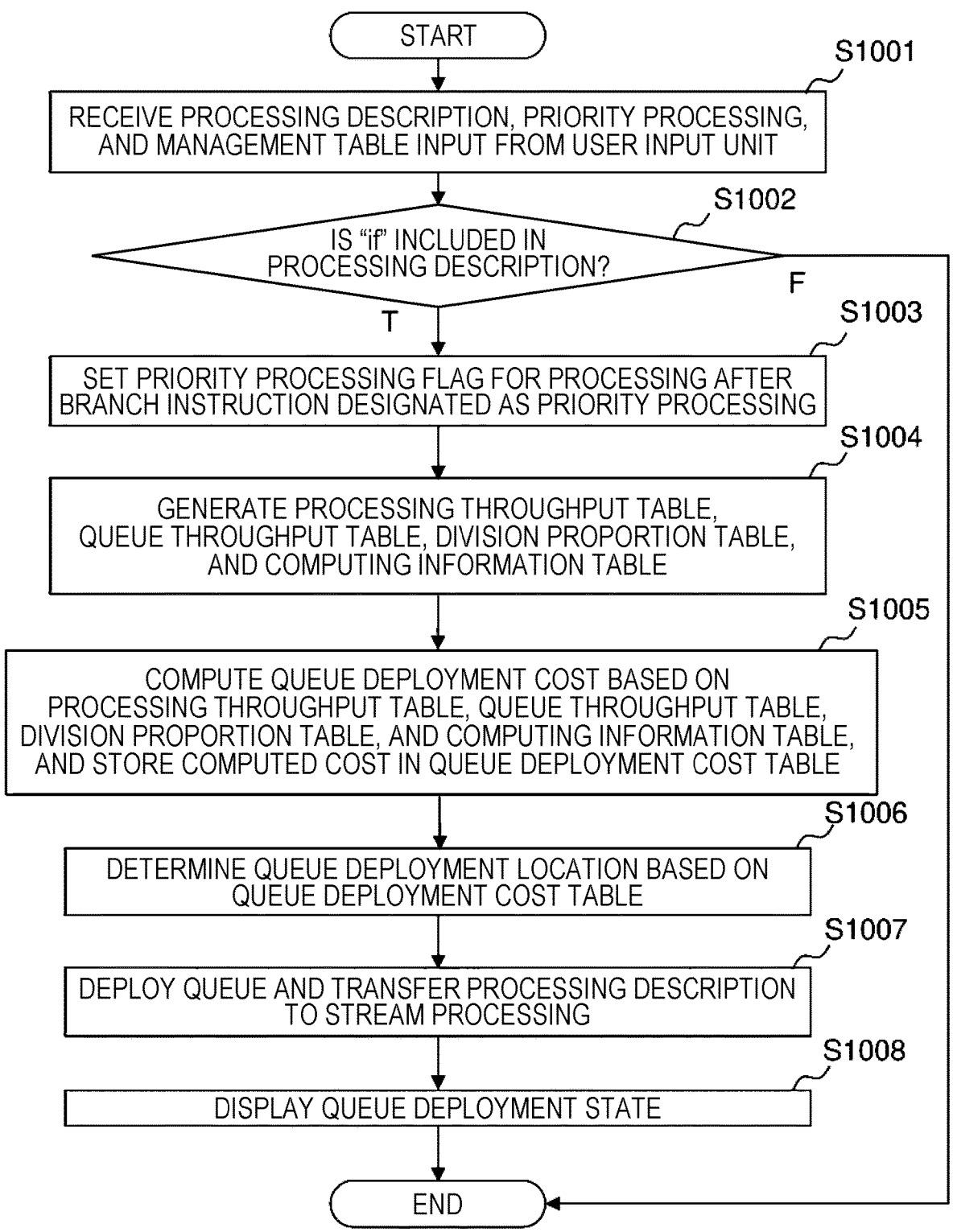
FIG. 10 is a flowchart illustrating an example of processing until the system of the present invention reads the processing description and deploys a queue.

An operation example of the queue deployment system 113 will be described below. FIG. 10 is a flowchart illustrating an example of the operation of the queue deployment system 113 (deployment of the stream processing). Note that steps (processing) in the flowchart will be described as the operation example at the time of inputting the processing description illustrated in FIG. 9.

Figure 11:
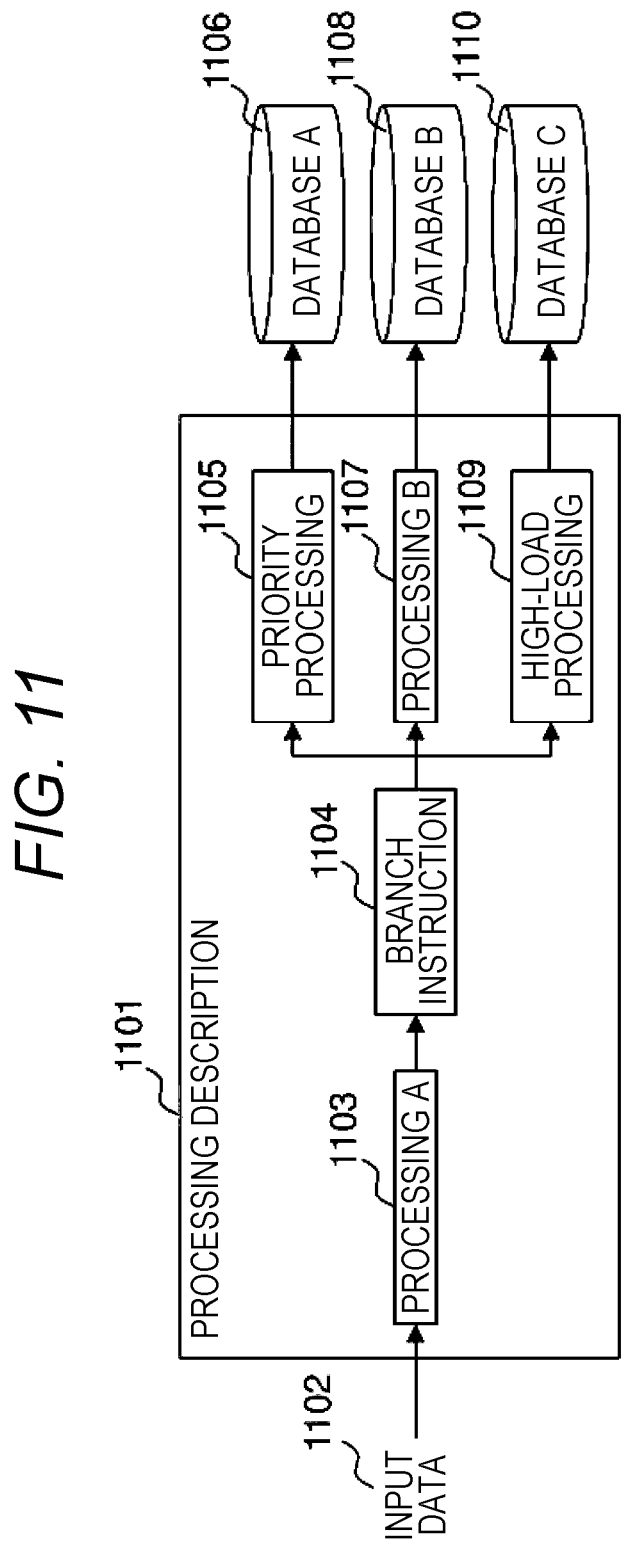
FIG. 11 is a diagram illustrating an example of the processing description to be input to the system of the present invention.

First, an input-output relationship of data will be described with reference to FIG. 11. A processing procedure of FIG. 11 illustrates an example of a processing description 1101 described by the user, and an input-output relationship of the processing description 1101 as a flow.

Input data 1102 is first processed by processing A 1103, and then a conditional branch is performed by a branch instruction 1104. Depending on conditions, there are a case where the input data proceeds to priority processing 1105 and is then stored in a database A 1106, a case where the input data proceeds to database B 1108 after processing B 1107, and a case where the input data proceeds from high-load processing 1109 to a database C 1110.

The queue deployment system 113 receives the processing description 111 and the priority processing designation from the user input unit 129 (S1001). Note that the user may input data about the management table 119. In this case, the queue deployment system 113 receives data to be input to the management table 119. In a case where the processing description 111 includes a branch instruction (if in this example), the processing proceeds to step S1003 (S1002). On the other hand, in a case where no branch instruction is included, the processing ends.

The queue deployment system 113 reads the priority processing designation through a priority processing designation unit 118, and sets a priority processing flag for a function designated as the priority processing and a condition of the branch instruction (S1003). The queue deployment system 113 then generates a processing throughput table 120, a queue throughput table 121, a branch proportion table 122, and a computing information table 123 based on the processing description 111 (S1004).

Figure 12:
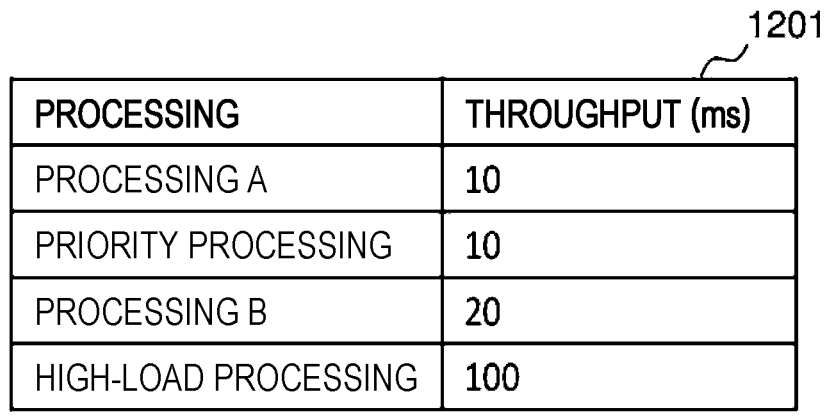
FIG. 12 illustrates an example of a processing throughput table in the system of the present invention.

Here, each table will be described. First, an example of the processing throughput table 120 will be described with reference to FIG. 12. FIG. 12 illustrates an example of the processing throughput table 120. The processing throughput table includes data obtained by compiling the throughputs of respective processing. In this example, the table includes processing throughput information 1201 of each function in the processing description 111.

Figure 13:
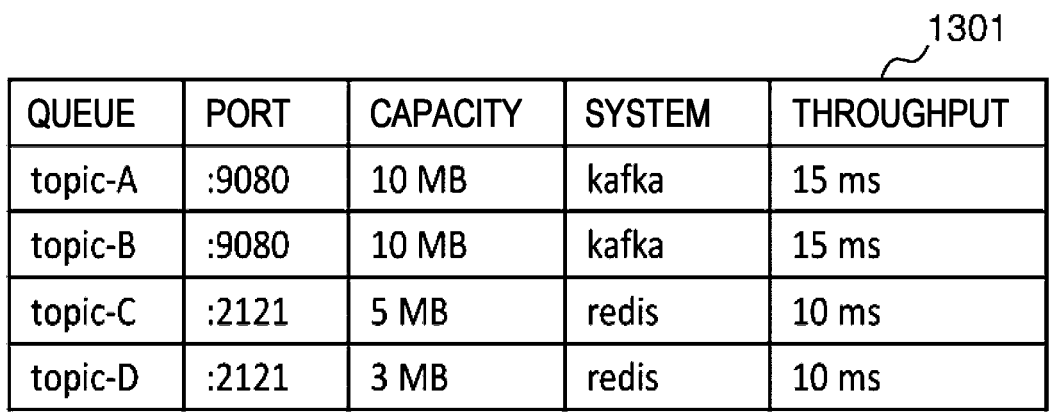
FIG. 13 illustrates an example of a queue throughput table in the system of the present invention.

An example of the queue throughput table 121 will be then described with reference to FIG. 13. FIG. 13 illustrates an example of the queue throughput table 121. In this example, the queue throughput table 121 is a table including the performance of the queue deployed by the queue deployment system 113 and throughput information 1301 at transfer of data to the queue. For example, queue name "topic-A" is a system that has port number of 9080, and capacity of 10 MB, and uses open source software (OSS) "kafka". The throughput information string is essential in the queue throughput table 121, but performance information about other queues may be optional.

The branch proportion table 122 will be then described with reference to FIG. 14. FIG. 14 illustrates an example of a branch proportion table 122. The branch proportion table 122 indicates a proportion 1401 at which the input data is processed by respective processing branched by the branch instruction in the processing description during a certain period. As an example of FIG. 14, 30% of the input data during a certain period is determined as an if-1 branch, and processing at the branch if-1 in the processing description is executed. Here, the period can be set to any value by the user through the user input unit 129. Further, in this example, the branch proportion is obtained by a branch distribution obtaining unit 117. Note that the user may input a similar proportion 1501. In this case, as illustrated in FIG. 15, a screen for input to the table may be displayed on the user input unit 129 (specifically, the table input unit 132).

The computing information table 123 will be then described with reference to FIG. 16. FIG. 16 illustrates an example of the computing information table 123. The computing information table 123 holds the number of workers 1601, an inflow amount 1602 of the input data per unit time, and a measurement period 1603. In a case where there is another variable necessary for the computing, this table can be held.

Figure 20:
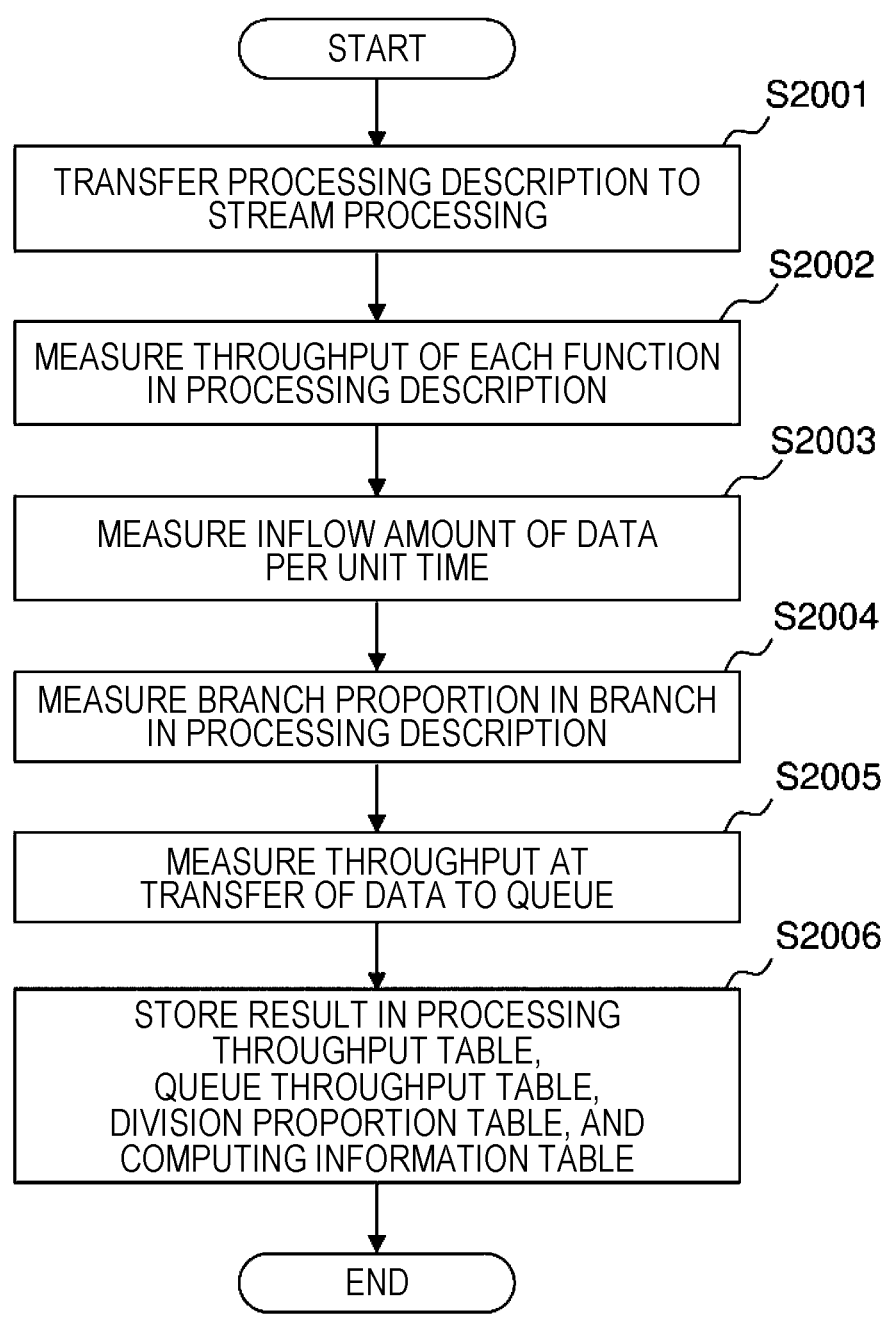
FIG. 20 is a flowchart illustrating an example where the system of the present invention performs measurement for the stream processing in operation.

In the present embodiment, the throughput information in the processing throughput table 120 and the queue throughput table 121, the inflow amount of the input data in the computing information table 123, and the proportion information in the branch proportion table 122 are stored by the queue deployment computing unit 114 performing measurement in accordance with a flowchart illustrated in FIG. 20, described later, at reading of the processing description. Further, in addition to the method illustrated in FIG. 20, in another method, in a case where throughput information is present at the time of operating on the stream processing system in advance, the information may be read. Alternatively, each piece of information may be generated by a method with which the user directly inputs the information through the user input unit 129.

Figure 21:
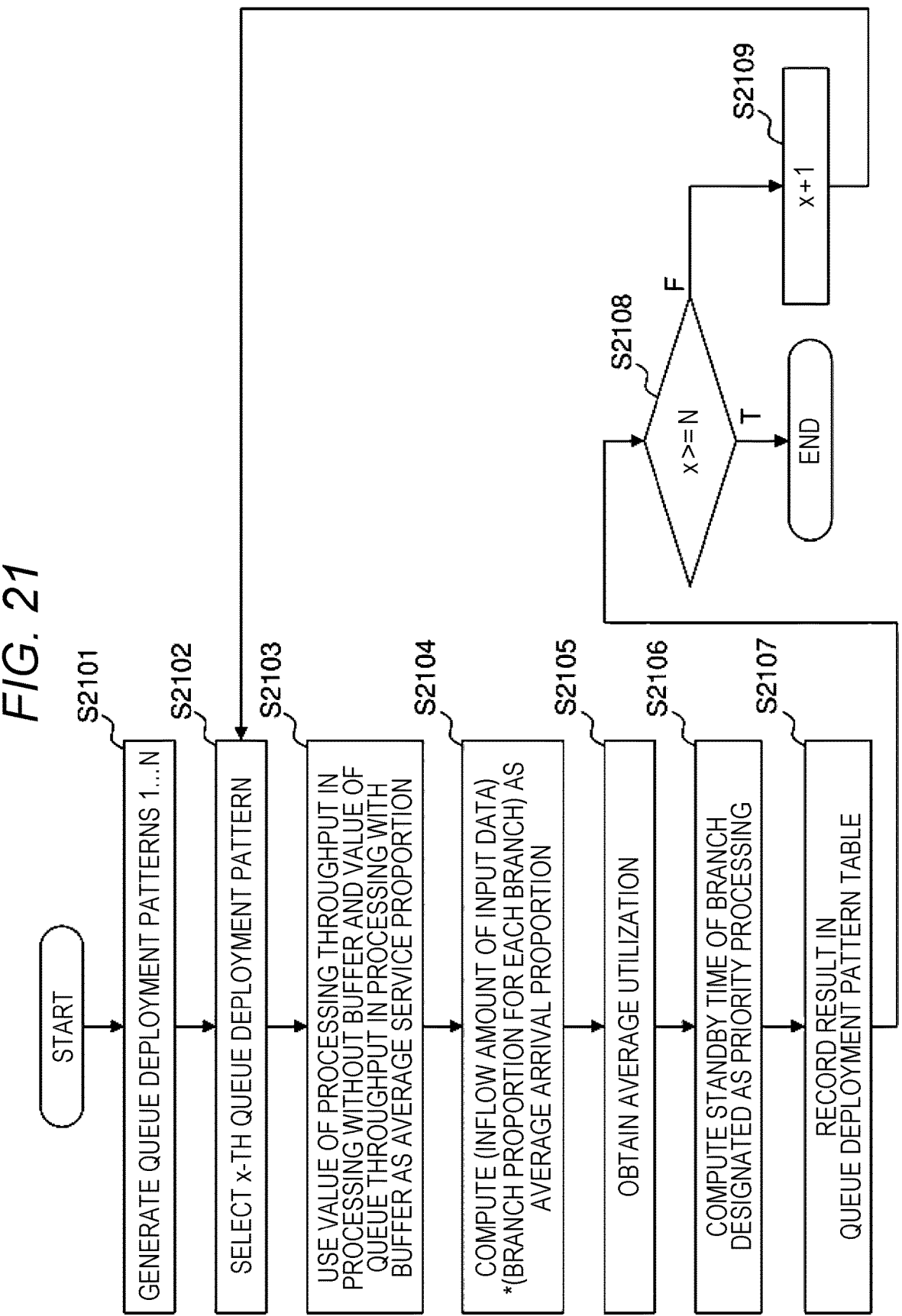
FIG. 21 is a flowchart illustrating an example of computation in step S1005.

The queue deployment system 113 computes a throughput improvement value in each queue deployment pattern based on the processing throughput table 120, the queue throughput table 121, the branch proportion table 122, and the computing information table 123 in accordance with a flowchart illustrated in FIG. 21, described later, and stores the throughput improvement values in a queue deployment pattern table 124 (S1005).

Here, the queue deployment pattern table 124 will be described. FIG. 17 illustrates an example of the queue deployment pattern table 124. Each column indicates a branch in the processing description and an improved throughput of the priority processing, and each row indicates a pattern of deploying a queue. For example, a row 1701 indicates a pattern where the queue is not deployed in the priority processing and the high-load processing but the queue is deployed in the processing B. At that time, the improved throughput cannot be expected. A row 1702 indicates a pattern where a queue is not deployed in the priority processing but a queue is deployed in the processing B and the high-load processing, and that the improved throughput is 11 (ms). Note that the deployment cost for each deployment combination in a case where the queue is deployed is computed by a deployment computing unit 116.

The queue deployment execution unit 125 determines a location where a queue is deployed, based on the queue deployment pattern table. In the example of the queue deployment pattern table in FIG. 17, the deployment cost of the row 1702 is 11 (ms), and thus that throughput improvement can be expected the most. Therefore, queue deployment to the branch destinations of the processing B and the high-load processing is determined (S1006).

The queue deployment system 113 divides the processing description in the form determined in step S1006, transfers the processing description to the stream processing system 108, and deploys queues (S1007). In the example of the queue deployment pattern table of FIG. 17, the queue deployment execution unit 125 deploys queues to the destinations of the branch instruction for branching to the processing B and the high-load processing. At this time, the processing description is separated by a processing description after the processing B, a processing description after the high-load processing, and a processing description including other priority processing. Therefore, for example, in a case where the input data proceeds to the processing at the branch destination including the high-load processing, the data at the time of the instruction branch is first transferred to the queue, and the worker 110 is released. Thereafter, the worker 110 is assigned to the processing description including the high-load processing, and the data being processed stored in the queue is read.

Figure 18:
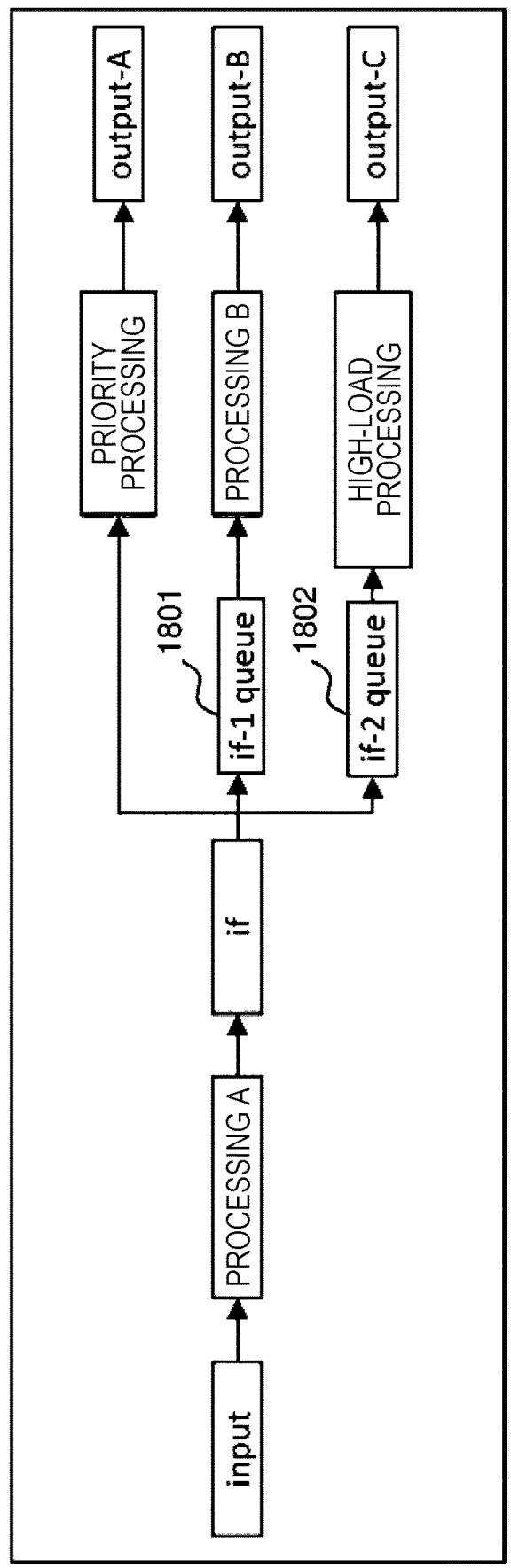
FIG. 18 is a diagram illustrating an example where processing description and the queue deployment output by the system of the present invention are displayed.
Figure 19:
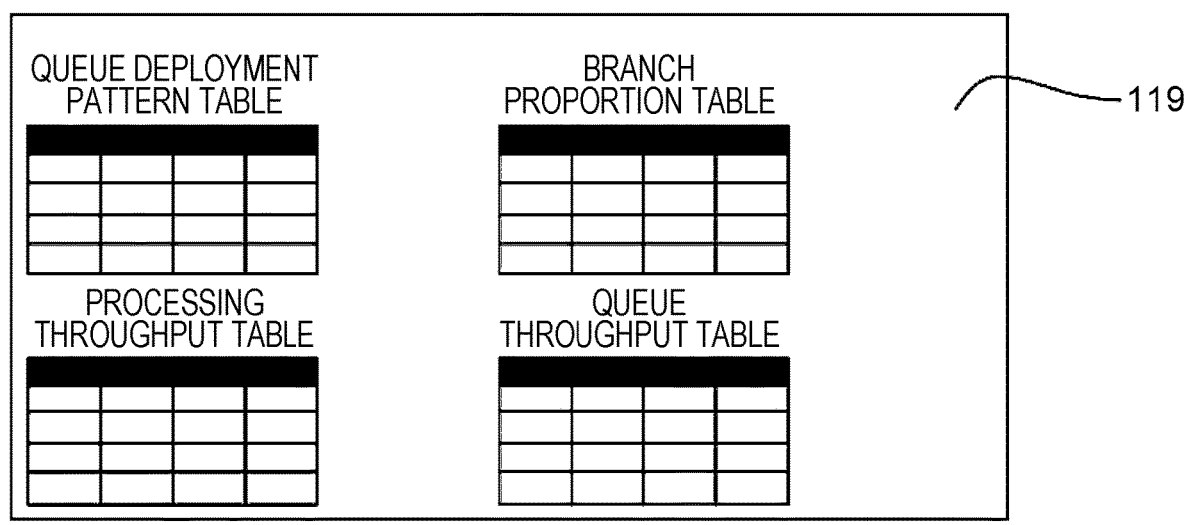
FIG. 19 is a diagram illustrating an example of a table display unit that displays a table output by the system of the present invention.

The queue deployment execution unit 125 transfers the processing description as a result of deploying the queue and a queue deployment status of the queue to the result display unit 128 of the user output unit 126, and displays information regarding the queue deployment status (S1008). FIG. 18 illustrates an example of a screen displaying the processing description and the queue deployment status. Here, FIG. 18 indicates that an if-1 queue node 1801 deploys a queue before the processing B and an if-2 queue node 1802 deploys a queue before the high-load processing. Note that, in addition to the queue deployment status illustrated in FIG. 18, in the user output unit 126, the management table 119 may be displayed on the table display unit 127 as illustrated in FIG. 19.

Next, specific processing of the queue deployment system 113 will be described. FIG. 20 is a flowchart illustrating an example of processing in a case where the queue deployment computing unit 114 makes measurements in the processing throughput table 120, the queue throughput table 121, the branch proportion table 122, and the computing information table 123. This flowchart is executed in step S1004.

A load measurement unit 115 transfers the processing description to the stream processing system 108 (S2001). Note that the processing description is simply a processing description that does not deploy a queue and has been received by the user input unit 129.

The load measurement unit 115 separates each function in the processing description and measures throughputs (S2002). An example of the unit of the function at this time is a function node level designed on the input screen illustrated in FIG. 9. Further, the throughput value of each function shall take an average value during a certain period. In addition, the load measurement unit 115 measures an amount of data flowing into the stream processing system 108 (S2003). The load measurement unit 115 may measure the inflow amount of data per unit time during the measurement period.

During a certain period, the branch distribution obtaining unit 117 measures a proportion of data transfer to each branch in branch instructions in the processing description (S2004). That is, the branch distribution obtaining unit 117 measures how much respective processing at the branch destination operates per unit time.

The load measurement unit 115 transfers data from the stream processing to the queue, and measures a throughput until the stream processing receives the data transferred to the queue (S2005).

The queue deployment computing unit 114 stores the results measured in steps S2002, S2003, S2004, and S2005 in the processing throughput table 120, the queue throughput table 121, the branch proportion table 122, and the computing information table 123, respectively (S2006).

Processing relating to step S1005 described above will be then described with reference to FIG. 21. FIG. 21 illustrates an example of a flowchart of queue computing in step S1005.

The queue deployment system 113 generates a queue deployment pattern indicating a combination of queue deployment for a branch instruction (S2101). At this time, the queue deployment system 113 generates a pattern of deploying a queue based on the number of processors that execute a stream processing, but does not generate a pattern of deploying a queue for a branch instruction having a function designated as a priority processing by the user. Note that the number of workers 1601 in the computing information table 123 may be searched.

Figure 22:
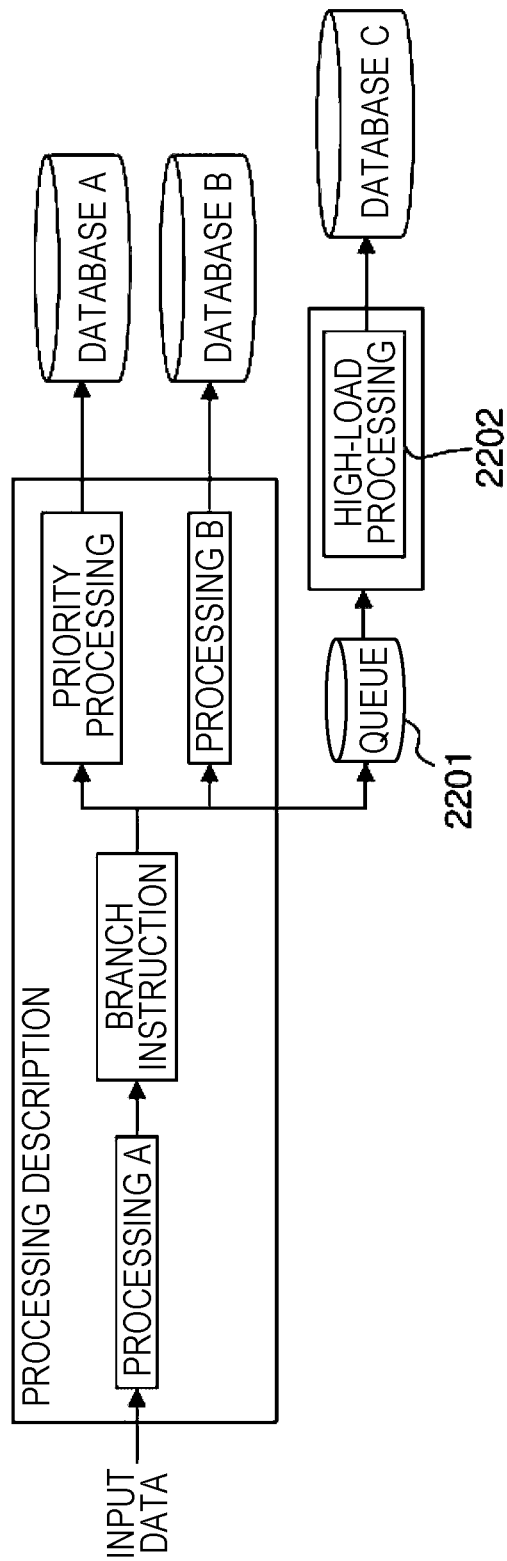
FIG. 22 is a diagram illustrating one of patterns at division of the input processing description using a queue in the system of the present invention.
Figure 23:
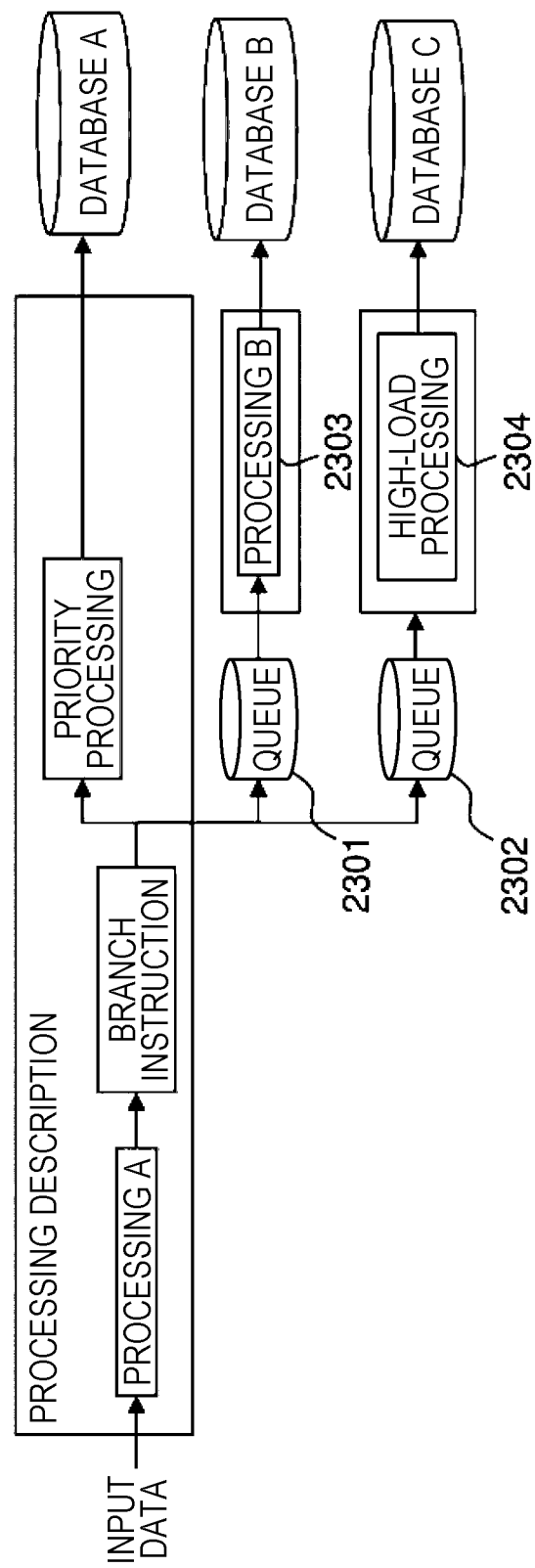
FIG. 23 is a diagram illustrating one of patterns at division of the input processing description in accordance using a queue in the system of the present invention.
Figure 24:
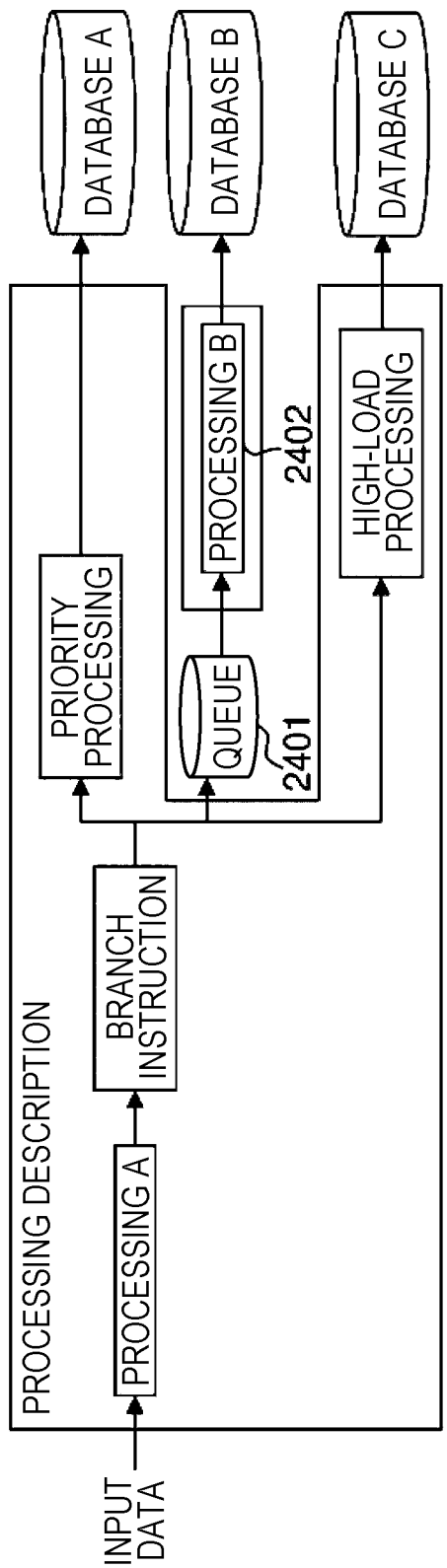
FIG. 24 is a diagram illustrating one of patterns at division of the input processing description in accordance using a queue in the system of the present invention.

Here, examples of generating a queue deployment pattern with the processing flow illustrated in FIG. 11 being an input are illustrated in FIGS. 22, 23, and 24.

FIG. 22 illustrates a pattern of deploying a queue 2201 before high-load processing 2202. At this time, the high-load processing is separated from the processing description at user input and operates as another processing description. FIG. 23 illustrates a pattern of separating processing B 2303 and high-load processing 2304 and deploying a queue 2301 and a queue 2302 before the processing B 2303 and the high-load processing 2304, respectively. Similarly to FIG. 22, the processing B 2303 and the high-load processing 2304 are treated as different processing descriptions. FIG. 24 illustrates a pattern of deploying a queue 2401 only before processing B 2402. A pattern of not deploying a queue illustrated in FIG. 11 is set as a first pattern, and subsequently the above-described three patterns of deploying the above queues are generated as a list.

The queue deployment system 113 computes the first pattern and then subsequent patterns generated in step S2101 (S2102). Here, in each branch instruction, processing with no buffer treats a throughput value of the processing, and processing with buffer treats a throughput value of a queue as an average service proportion in the queue (S2103). For example, in the case of the throughput illustrated in FIG. 12 in the pattern having the configuration illustrated in FIG. 11, the average service proportion of the priority processing is 1/10.

The queue deployment system 113 treats (inflow amount of input data)×(branch proportion for each branch) as an average arrival proportion (S2104). In the pattern illustrated in FIG. 11, in a case of the input data inflow amount 1602 and the measurement period 1603 illustrated in FIG. 16, and the branch proportion table illustrated in FIG. 14, the inflow amount per unit time (ms) of the input data is 0.1, and the average arrival proportion is 0.03 obtained by 0.1×0.3 in the if-1 branch.

The queue deployment system 113 obtains the average utilization of the entire stream processing based on an average of the average service proportion and the average arrival proportion in respective processing (S2105). In the example of step S2105 in the case illustrated in FIG. 11, 0.03×10=0.3 in the if-1 branch. All the instruction branches are then added and averaging of the added value produces 1.1.

The queue deployment system 113 obtains a waiting time in the branch designated as the priority processing based on the average utilization, adds the throughput value of the priority processing to the queueing time, and sets the added value as the time taken for the processing in a case where a priority processing determination is made (S2106). In the example after step S2605 in the case illustrated in FIG. 11, the waiting time increases infinitely because the average utilization exceeds 1. In the configuration example of the stream processing illustrated in FIG. 23, the waiting time in the branch designated as priority processing is 11 (ms) based on the processing throughput table illustrated in FIG. 12, the queue throughput table illustrated in FIG. 13, the branch proportion table illustrated in FIG. 14, and the computing information table illustrated in FIG. 16.

The queue deployment system 113 records the result in the queue deployment pattern table (S2107). In the example subsequent to step S2105, as illustrated in the queue deployment pattern table of FIG. 17, as for the throughput in the branch designated as the priority processing, improvement of the throughput cannot be expected in a case where the queue is deployed in the processing B, improvement to 13 (ms) can be expected in a case where the queue is deployed in the high-load processing, and improvement to 11 (ms) can be expected in a case where the queue is deployed in the processing B and high-load processing.

When the x-th value is not the maximum value or more, the processing proceeds to step S2109, and when the x-th value is the maximum value or more, the processing ends (S2108). In step S2109, processing for adding 1 to x is executed. As described above, it is possible to compute how much the throughput of the priority processing is improved in each queue deployment pattern as compared with FIG. 11. Note that, in this flow, the waiting time (improved throughput) is computed by execution of the deployment computing unit 116.

By appropriately deploying the queue in the processing description input by the user through the system described above, it is possible to improve the throughput of the priority processing in the stream processing.

Next, a second embodiment will be described. A portion of the description similar to the content already described may be omitted.

Second Embodiment

Figure 25:
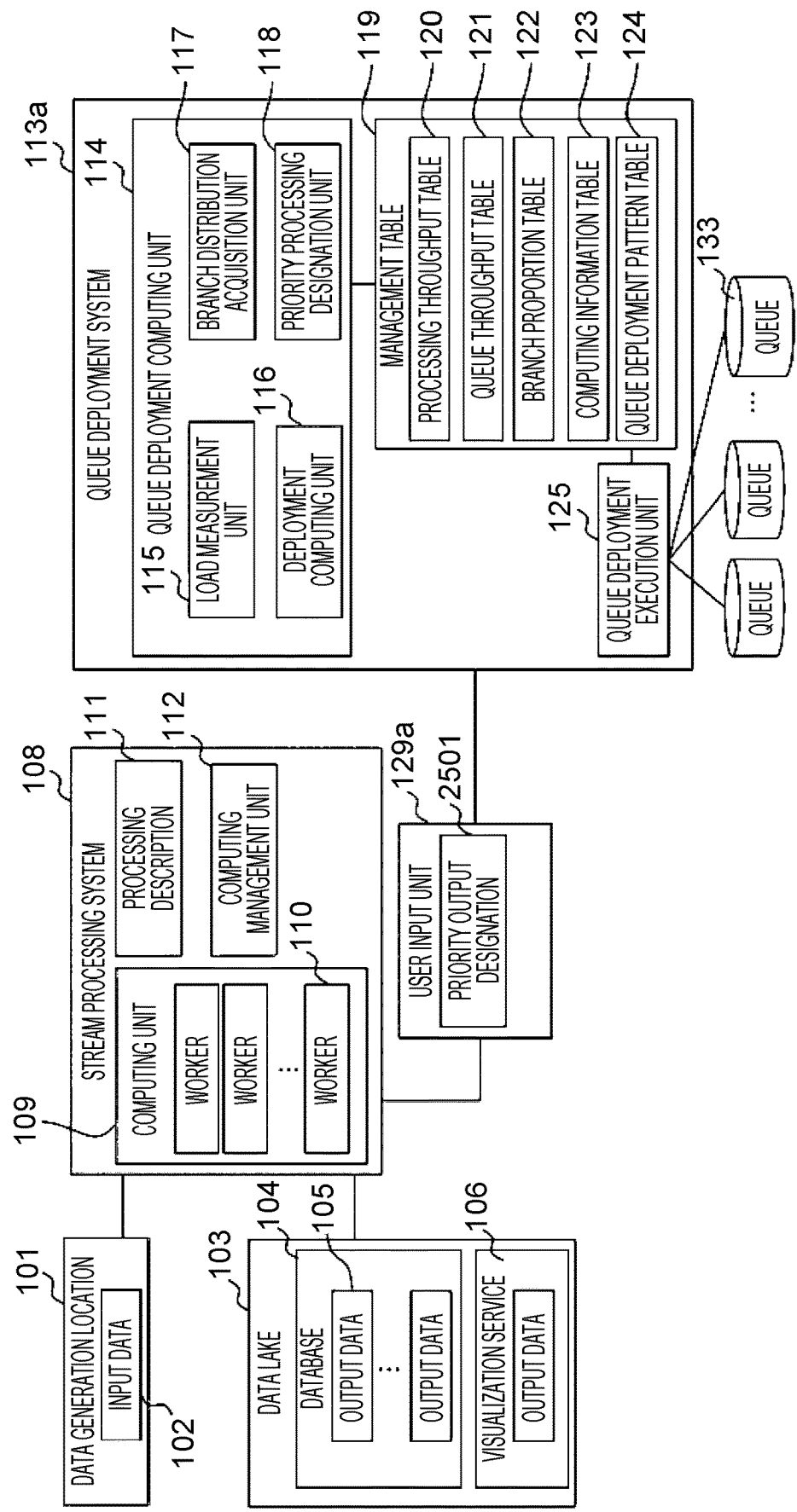
FIG. 25 is a diagram illustrating an exemplary configuration of the system of the present invention.

FIG. 25 is a diagram illustrating a system according to the second embodiment. Unlike the case of the first embodiment, the configuration of the user output unit is omitted, and the configuration of the user input unit is changed. In the system illustrated in FIG. 25, the queue deployment system computes the queue deployment for the processing description in operation during the stream processing, and redeploy the queue and the processing description.

An operation example in the present embodiment will be described with reference to the drawings. FIG. 26 is a flowchart illustrating an example of the operation of the queue deployment system for the stream processing in operation.

A queue deployment system 113a acquires information about priority output designation 2501 from a user input unit 129a (S2601). Here, the priority output designation is to designate an output destination to which stream processing is desired to be preferentially output. The output destination or the like in which a real-time property is emphasized can be cited as an example.

The queue deployment system 113a reads the processing description in operation in the stream processing (S2602). Here, in a case where the processing description includes a branch instruction and the output destination is designated as priority output, the processing proceeds to step S2604 (S2603). Otherwise, the processing ends. The queue deployment system 113a designates a function at a branch instruction destination whose output destination is designated as a priority output as the priority processing (S2604). The queue deployment system 113a proceeds to step S1004 in FIG. 10 (S2605). In step S1004 and subsequent steps in FIG. 10, the queue is deployed by the same operation as in the first embodiment.

The above embodiments provide a system having a function of designating processing at an important branch destination where a decrease in a throughput is desired to be prevented, among respective processing having a branch instruction in stream processing, computing throughputs of the respective processing at respective branch destinations that change when queues are deployed respectively in the respective processing at the branch destinations excluding the important branch processing, based on data inflow amounts per unit time, proportions of branch distribution, throughputs in the respective branched processing, throughputs at the deployment of the queues, and the number of workers, creating a queue deployment pattern table in which the computed results are compiled, and respectively deploying the queues immediately after the respective branched processing with a pattern of the lowest cost in the queue deployment pattern table. The system enables the queue deployment that improves the throughput of the important processing requiring the real-time property. Therefore, an increase in the number of data processing times is expected by appropriately improving the stream processing, and thus an economically favorable data processing can be executed.

Although the embodiments have been described above, the embodiments are examples for describing the present invention, and omission and simplification are appropriately made for clarification of description. The present invention can be carried out in various other modes. Unless otherwise specified, each component may be singular or plural.

Positions and the like of the respective components illustrated in the drawings do not necessarily represent actual positions and the like in order to facilitate understanding of the invention. Therefore, the present invention is not necessarily limited to the positions disclosed in the drawings.

Examples of various types of information may be described in terms of expressions such as "table" and "list", but various types of information may be expressed in a data structure other than these. For example, various types of information such as "XX table" and "XX" list may be "XX information. In the description about the identification information, expressions such as "identification information", "identifier", "name", "ID", and "number" are used, but these can be replaced with each other.

The system of the present invention may be configured by, for example, one or a plurality of computers as long as appropriate processing can be executed.

When the processor 203 of the queue deployment system executes various programs, the queue deployment system executes predetermined processing. Here, the queue deployment computing unit 114, the load measurement unit 115, the deployment computing unit 116, the branch distribution obtaining unit 117, the priority processing designation unit 118, and the queue deployment execution unit 125 are programs, and may be stored in an appropriate storage device of the queue deployment system. In addition, other programs that execute a predetermined processing (such as processing relating to the processing procedure described above) may be stored in an appropriate storage device of the queue deployment system. Further, the queue deployment system may include an interface that inputs and outputs data to and from an external storage device externally attached. Then, the queue deployment system may execute the processing using the external storage device that stores the programs.

What is claimed is:

1. A data processing management system comprising a queue deployment system that deploys a queue with a processing description of stream processing having a branch instruction being an input,
   wherein the queue deployment system
   designates processing to be preferentially executed for the processing description,
   measures throughputs in respective processing after the branch instruction,
   obtains branch proportions at which the respective processing after the branch instruction is executed,
   computes deployment costs in a case of deploying a queue between the branch instruction and the respective processing after the branch instruction respectively for combinations of the respective processing after the branch instruction, using the throughputs and the branch proportions, and
   outputs a queue deployment pattern for preventing a decrease in a throughput of the processing to be preferentially executed among the respective processing after the branch instruction.

2. The data processing management system according to claim 1,
   wherein the queue deployment system is connected with a stream processing system that includes a finite number of processors and causes the processors to process data input in a stream format, based on the processing description, and
   wherein the queue deployment system acquires the processing description from the stream processing system.

3. The data processing management system according to claim 2, wherein
   the queue deployment system
   determines, based on the deployment costs, a location where the queue is deployed in accordance with the queue deployment pattern, and
   divides the processing description to deploy the queue.

4. The data processing management system according to claim 1, wherein the queue deployment system computes the deployment costs further using a data inflow amount per unit time and a number of the processors that execute the stream processing.

5. The data processing management system according to claim 4, wherein the queue deployment system generates a queue deployment pattern table in which the deployment costs for respective queue deployment patterns are compiled by queue computing based on the measured throughputs, the branch proportions, the data inflow amount, and the number of the processors.

6. The data processing management system according to claim 1, wherein the queue deployment system measures a throughput at transfer of data to the queue in addition to the throughputs in the respective processing after the branch instruction.

7. The data processing management system according to claim 1, wherein the queue deployment system measures how much the respective processing at the branch destination is executed per unit time when obtaining the branch proportions of the respective processing.

8. The data processing management system according to claim 1, further comprising a user output unit configured to present information to a user,
wherein the queue deployment system deploys the queue based on the queue deployment pattern, and
wherein the user output unit displays information about a state where the queue is deployed.

9. The data processing management system according to claim 1, further comprising a user input unit through which a user inputs information,
wherein the queue deployment system acquires the processing description from the user input unit.

10. The data processing management system according to claim 9, wherein the user input unit connects nodes indicating the respective processing using edges to output a screen for inputting the processing description.

11. The data processing management system according to claim 10, wherein the user input unit outputs, in a case where any node indicating processing is selected, a screen for designating that the processing indicated by the node is preferentially executed.

12. A data processing management method that is performed by using a processor, the method comprising:
acquiring a processing description of stream processing having a branch instruction;
designating processing to be preferentially executed for the processing description;
measuring throughputs in respective processing after the branch instruction;
obtaining branch proportions at which the respective processing after the branch instruction is executed;
computing deployment costs in a case of deploying a queue between the branch instruction and the respective processing after the branch instruction respectively for combinations of the respective processing after the branch instruction, using the throughputs and the branch proportions;
outputting a queue deployment pattern for preventing a decrease in a throughput of the processing to be preferentially executed among the respective processing after the branch instruction; and
deploying the queue based on the queue deployment pattern.

* * * * *